(12) United States Patent
Tatomir

(10) Patent No.: US 11,266,197 B2
(45) Date of Patent: Mar. 8, 2022

(54) MOUNTING ASSEMBLY FOR A FACE SHIELD WITH AN ENHANCED BASE

(71) Applicant: Wally Wayne Tatomir, Raleigh, NC (US)

(72) Inventor: Wally Wayne Tatomir, Raleigh, NC (US)

(*) Notice: Subject to any disclaimer, the term of this patent is extended or adjusted under 35 U.S.C. 154(b) by 539 days.

(21) Appl. No.: 15/235,599

(22) Filed: Aug. 12, 2016

(65) Prior Publication Data
US 2017/0042274 A1  Feb. 16, 2017

Related U.S. Application Data

(60) Provisional application No. 62/205,260, filed on Aug. 14, 2015.

(51) Int. Cl.
*A42B 3/22* (2006.01)
*F16B 5/02* (2006.01)
*F16B 39/282* (2006.01)

(52) U.S. Cl.
CPC ........... *A42B 3/221* (2013.01); *F16B 5/0225* (2013.01); *F16B 39/282* (2013.01)

(58) Field of Classification Search
CPC .............................. A42B 3/221; F16B 5/0225
USPC ............................................................ 2/424
See application file for complete search history.

(56) References Cited

U.S. PATENT DOCUMENTS

| | | | |
|---|---|---|---|
| 2,850,740 A | 9/1958 | Adams | |
| 3,263,236 A * | 8/1966 | Humphrey | A42B 3/20 2/9 |
| 3,274,613 A * | 9/1966 | Sowle | A42B 3/20 2/9 |
| 3,348,596 A | 10/1967 | Leitner | |
| 3,854,146 A | 12/1974 | Dunning | |
| 3,984,875 A * | 10/1976 | Farquharson | A42B 3/08 2/10 |
| 4,370,759 A | 2/1983 | Zide | |
| 4,448,565 A | 5/1984 | Peterson | |
| 5,095,552 A | 3/1992 | Parkinson | |
| 5,676,510 A | 10/1997 | Fischer et al. | |
| 5,978,972 A | 11/1999 | Chartrand | |
| 6,002,223 A * | 12/1999 | Audie | H01L 27/0248 318/400.26 |
| 6,038,740 A * | 3/2000 | Hoger | E05D 7/04 16/235 |
| 6,079,053 A | 6/2000 | Clover, Jr. et al. | |
| 6,126,355 A | 10/2000 | Clover, Jr. | |
| 6,202,223 B1 | 3/2001 | Chartrand | |
| 6,467,990 B1 | 10/2002 | Kremsler et al. | |
| 6,601,885 B1 * | 8/2003 | Yiu | E05B 79/04 292/337 |
| 6,807,679 B1 * | 10/2004 | Wang-Lee | A42B 3/225 16/334 |

(Continued)

*Primary Examiner* — Alissa J Tompkins
*Assistant Examiner* — Catherine M Ferreira
(74) *Attorney, Agent, or Firm* — Coats & Bennett, PLLC

(57) ABSTRACT

A face shield, such as a visor, mounts to a protective helmet using a mounting assembly. The mounting assembly has a base, a spacer assembly, and a pair of posts. The base is disposed on the interior of the helmet. The posts are connected to the base and extend outwardly into corresponding holes that are formed in the side of the helmet. The spacer assembly spaces the face shield away from the exterior surface of the helmet, and receives a mechanical fastener that releasably attaches the face shield to the helmet.

7 Claims, 11 Drawing Sheets

(56) References Cited

U.S. PATENT DOCUMENTS

| | | |
|---|---|---|
| 6,881,129 B2 | 4/2005 | Chopra et al. |
| 6,934,971 B2 | 8/2005 | Ide et al. |
| 7,958,567 B2 | 6/2011 | Sutter et al. |
| 8,051,499 B2 | 11/2011 | Lee |
| 8,166,576 B2 | 5/2012 | Kato |
| 8,899,867 B2 | 12/2014 | Tatomir |
| 9,004,801 B2 | 4/2015 | Tatomir |
| 9,408,429 B2 | 8/2016 | Tatomir |
| 2002/0062517 A1* | 5/2002 | Gafforio ................ A42B 3/222 2/424 |
| 2008/0189836 A1 | 8/2008 | Goodhand et al. |
| 2008/0250550 A1 | 10/2008 | Bologna et al. |
| 2011/0061152 A1* | 3/2011 | Wismann ................ A42B 3/20 2/424 |
| 2012/0144566 A1* | 6/2012 | Hunt ...................... A42B 3/223 2/422 |
| 2012/0222198 A1* | 9/2012 | Tatomir .................. A42B 3/20 2/422 |
| 2012/0222199 A1* | 9/2012 | Tatomir .................. A42B 3/20 2/422 |
| 2014/0359921 A1* | 12/2014 | Ide .......................... A42B 3/20 2/424 |

\* cited by examiner

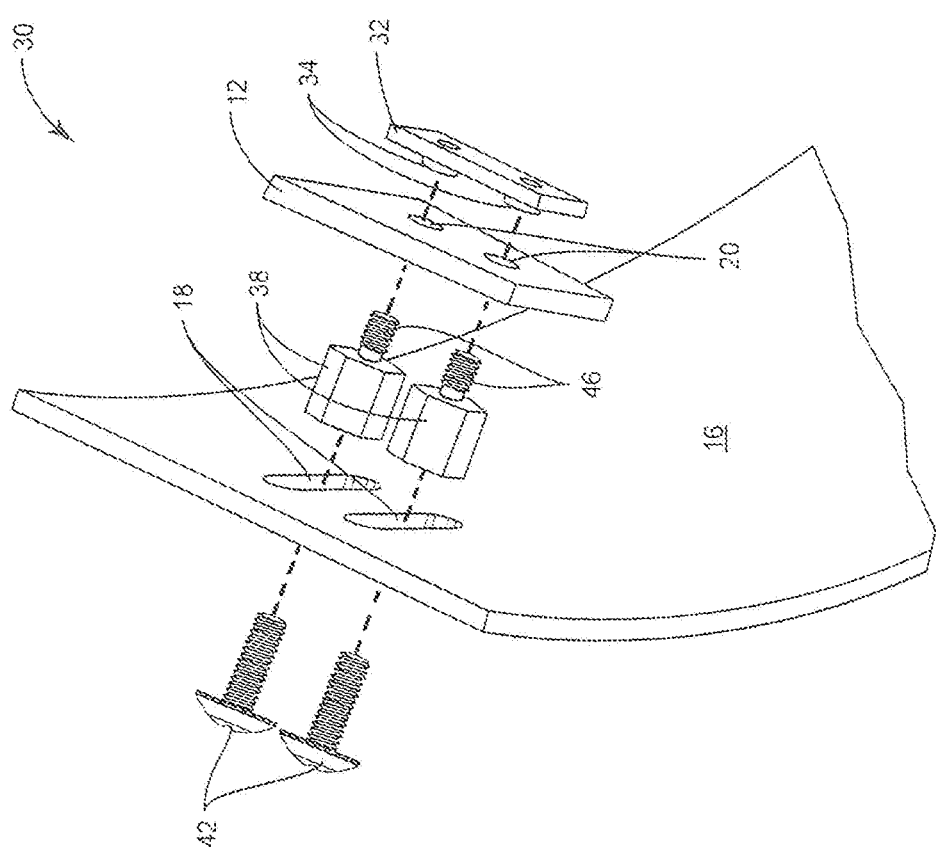

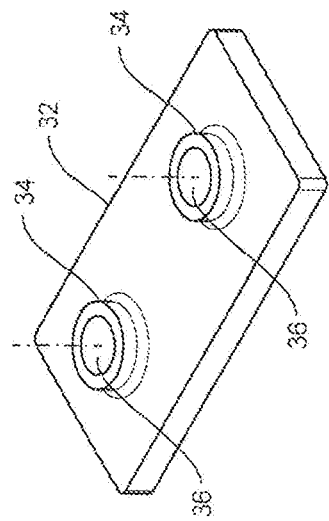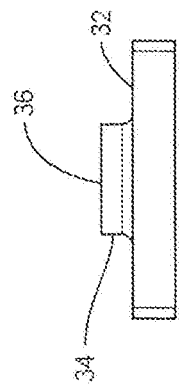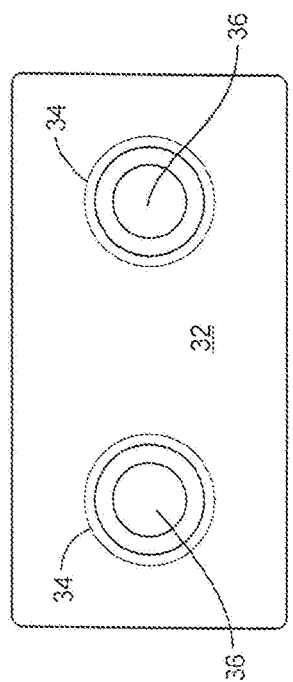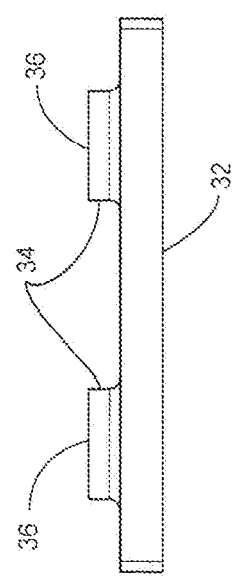

SECTION A-A

SECTION A-A

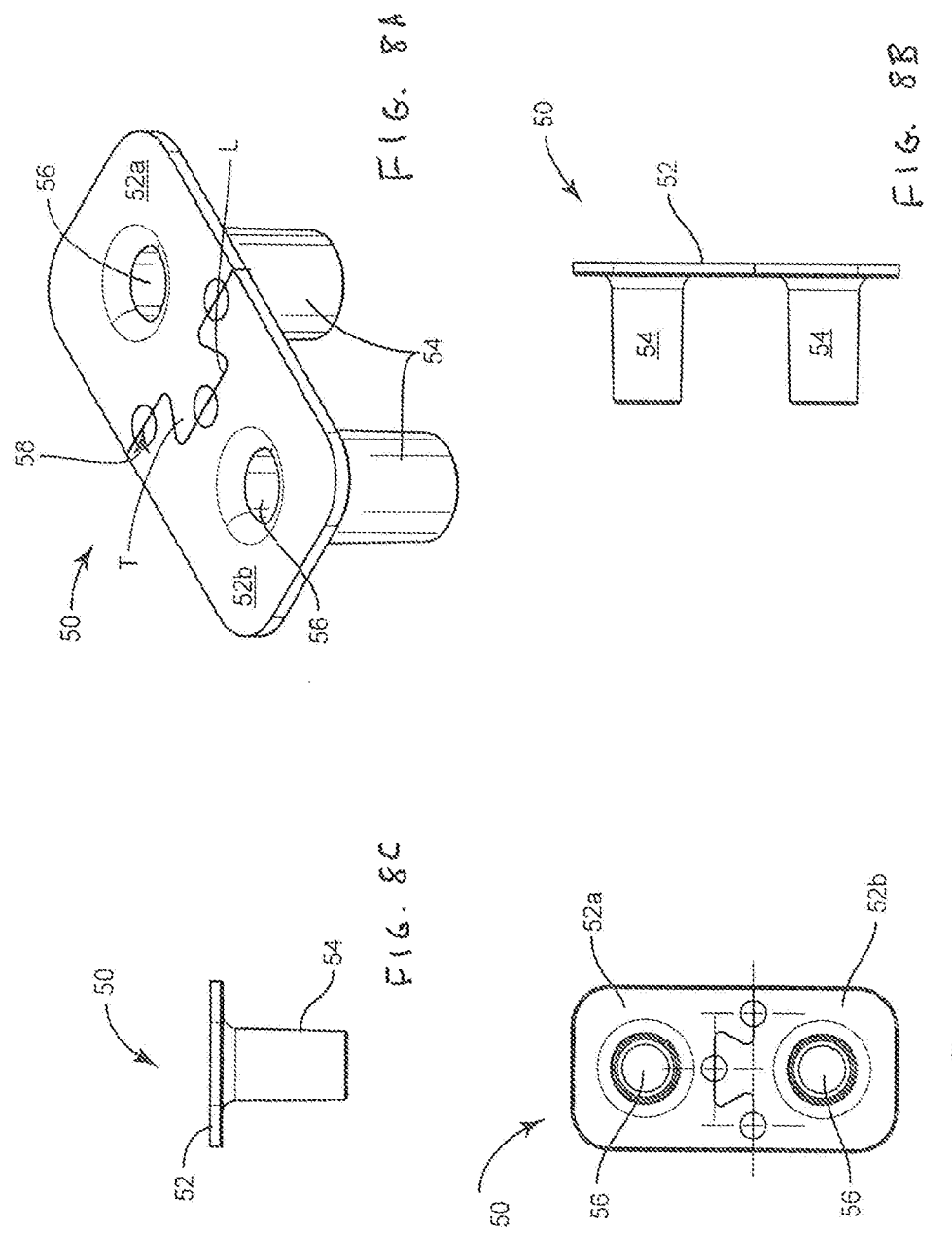

SECTION A-A

MOUNTING ASSEMBLY FOR A FACE SHIELD WITH AN ENHANCED BASE

RELATED APPLICATIONS

This applications claims priority to U.S. Provisional Patent Application Ser. No. 62/205,260 filed Aug. 14, 2015, the entire contents of which are incorporated herein by reference.

FIELD OF THE INVENTION

The present disclosure relates generally to face shields for protective headgear, and particularly to mounting assemblies for removably attaching a protective face shield to a headgear.

BACKGROUND

People wear protective headgear or helmets to help prevent head injuries. In many cases, the headgear also includes a face shield, cage, or visor that attaches to the headgear to provide additional protection for a person's face and eyes. By way of example, ice hockey players regularly wear a protective helmet with a face shield, cage, or visor to protect their heads and faces from possible injuries due to impact with objects such as the ice surface, other players, the boards, the puck, and sticks.

Conventionally, multiple mechanical fasteners, such as screws, are used to attach the face shield to each side of the helmet. Each screw passes through corresponding holes formed in the face shield and helmet, and into respective threaded nuts disposed on the inside of the helmet. However, attaching a face shield to a helmet using such conventional hardware is problematic and frustrating. Specifically, face shields are usually manufactured from a high impact-resistant, clear plastic. Although they generally conform to the shape of the front of the helmet to surround the front of a player's face, the terminal ends of the shield tend to bias outwardly away from the exterior surface of the helmet. This biasing force resists a user's efforts at initially attaching the face shield to the helmet. Additionally, when removing the face shield, the biasing force may "fling" the screws and/or other mounting assembly components away from the helmet if the user does not carefully prevent this from happening.

SUMMARY

The present disclosure provides a mounting assembly for attaching protective face shields to protective headgear. The protective headgear (e.g., a helmet), will protect a wearer's head from injuries that could occur due to contact with other objects. The face shield will help to protect the wearer's eyes and at least part of the wearer's face.

In one embodiment, the mounting assembly comprises a rectangular base, first and second posts, and a spacer assembly. The base has a substantially planar surface and is configured to be disposed on the interior of the helmet. The posts may be cylindrical and are connected to the base. When installed, the posts extend outwardly from the base and into corresponding holes formed in the side of the protective helmet. The posts are sized, in one embodiment, to insert into the holes from an interior of the helmet, but do not to extend all the way through the holes in the helmet. Rather, the terminal ends of the posts are substantially flush with, or slightly below, the exterior surface of the helmet.

The posts are also configured to threadingly receive one or more mechanical fasteners. In one embodiment, for example, the mechanical fasteners attach the face shield to the helmet. In these cases, the spacer assembly may comprise one or more spacers, each of which has a through hole to allow the mechanical fasteners attaching the face shield to pass through the spacer and thread into the post. In another embodiment, the mechanical fasteners include a threaded part that extends from one end of the spacer assembly. In this embodiment, the threaded part threadingly mates with the post.

The face shield, which may be a visor, for example, includes slots that align with the holes in the spacer assembly and the posts. As stated above, mechanical fasteners, such as screws, extend through the slots in the face shield and thread into the posts to secure the face shield to the helmet. In some embodiments, the spacer assembly may include a raised ridge. The ridge is sized and shaped to fit within the slots in the shield. The slots allow the ridge to move freely forward and backward along the slot, and thus, helps the user to install the face shield.

In one embodiment, the present disclosure provides a mounting assembly for attaching a face shield to a protective helmet. The assembly comprises a base having a planar surface, a first post connected to, and extending from, the base, and configured to be inserted into a first hole formed in the protective helmet such that a terminal end of the first post is substantially flush with, or below, an exterior surface of the protective helmet, and a spacer assembly comprising a first through hole configured to threadingly receive, at a first end of the spacer assembly, a mechanical fastener that attaches the base to the spacer assembly, and threadingly receive, at a second end of the spacer assembly opposite the first end, another mechanical fastener that attaches the face shield to the spacer assembly.

In one embodiment, the present disclosure provides a mounting assembly for attaching a face shield to a protective helmet. The assembly comprises a base having a planar surface, a first post connected to, and extending from, the base, and configured to be inserted into a first hole formed in the protective helmet such that a terminal end of the first post is substantially flush with, or below, an exterior surface of the protective helmet. In this embodiment, the spacer assembly comprises a first body configured to threadingly receive a mechanical fastener that attaches the face shield to the spacer assembly, and a first threaded post extending outwardly from the first body, and configured to threadingly engage an interior of the first post when the first post is inserted into the first hole formed in the helmet to attach the face shield and the spacer assembly to the protective helmet.

In one embodiment, the present disclosure provides a mounting assembly for attaching a face shield to a protective helmet. The assembly comprises a base having a planar surface and first and second posts connected to the base and extending outwardly from the base. The first and second posts are configured to be inserted through corresponding holes in the helmet and to receive one or more mechanical fasteners to releasably attach the face shield to the helmet. The assembly also comprises a spacer assembly. In this embodiment, the spacer assembly comprises a body having first and second generally non-coplanar opposing surfaces, and first and second through holes formed in the body. Each of the first and second through holes are configured to frictionally engage an outer surface of a respective one of the first and second posts when the first and second posts are inserted through the corresponding holes in the helmet so that the helmet is disposed between the planar surface of the base and the spacer assembly.

Of course, those skilled in the art will appreciate that the present disclosure is not limited to the above contexts or examples, and will recognize additional features and advantages upon reading the following detailed description and upon viewing the accompanying drawings.

BRIEF DESCRIPTION OF THE DRAWINGS

FIG. 4 is an exploded view of a mounting assembly for a face shield according to an embodiment of the present disclosure.

FIGS. 5A-5D illustrate a base of a mounting assembly according to an embodiment of the present disclosure.

FIGS. 8A-8D illustrate a segmented base component of a mounting assembly for a face shield according to an embodiment of the present disclosure.

DETAILED DESCRIPTION

The present disclosure provides a mounting assembly for attaching protective face shields to protective headgear. The helmet will protect a wearer's head from injuries that could occur due to contact with other objects, while the face shield will help protect the eyes and at least part of the wearer's face. Some suitable examples of protective helmets having face shields include, but are not limited to, helmets used by fire, police, and/or other rescue personnel, as well as those worn by construction personnel, and sports figures participating in a sport that requires the use of helmets.

As stated previously, conventional face shields attach to protective helmets using multiple screws. Each screw extends through the face shield and the helmet, and anchors into a corresponding T-nut positioned within the interior of the helmet. Although they secure the face shield to the helmet, conventional components are small and difficult to manipulate simultaneously with the helmet and the face shield. Further, conventional methods of attachment are problematic and frustrating, and are prone to the loss of the hardware needed to secure the face shield to the helmet.

The present disclosure, however, obviates these problems by providing a mounting assembly that releasably secures the face shield to the helmet. The mounting assembly comprises component parts that are easier to manipulate than are the individual fasteners of the prior art. More particularly, with the mounting assembly of the present disclosure, it is easier for the user to hold and align both the face shield and the helmet while attaching and removing the face shield to/from the helmet.

Figure 1:
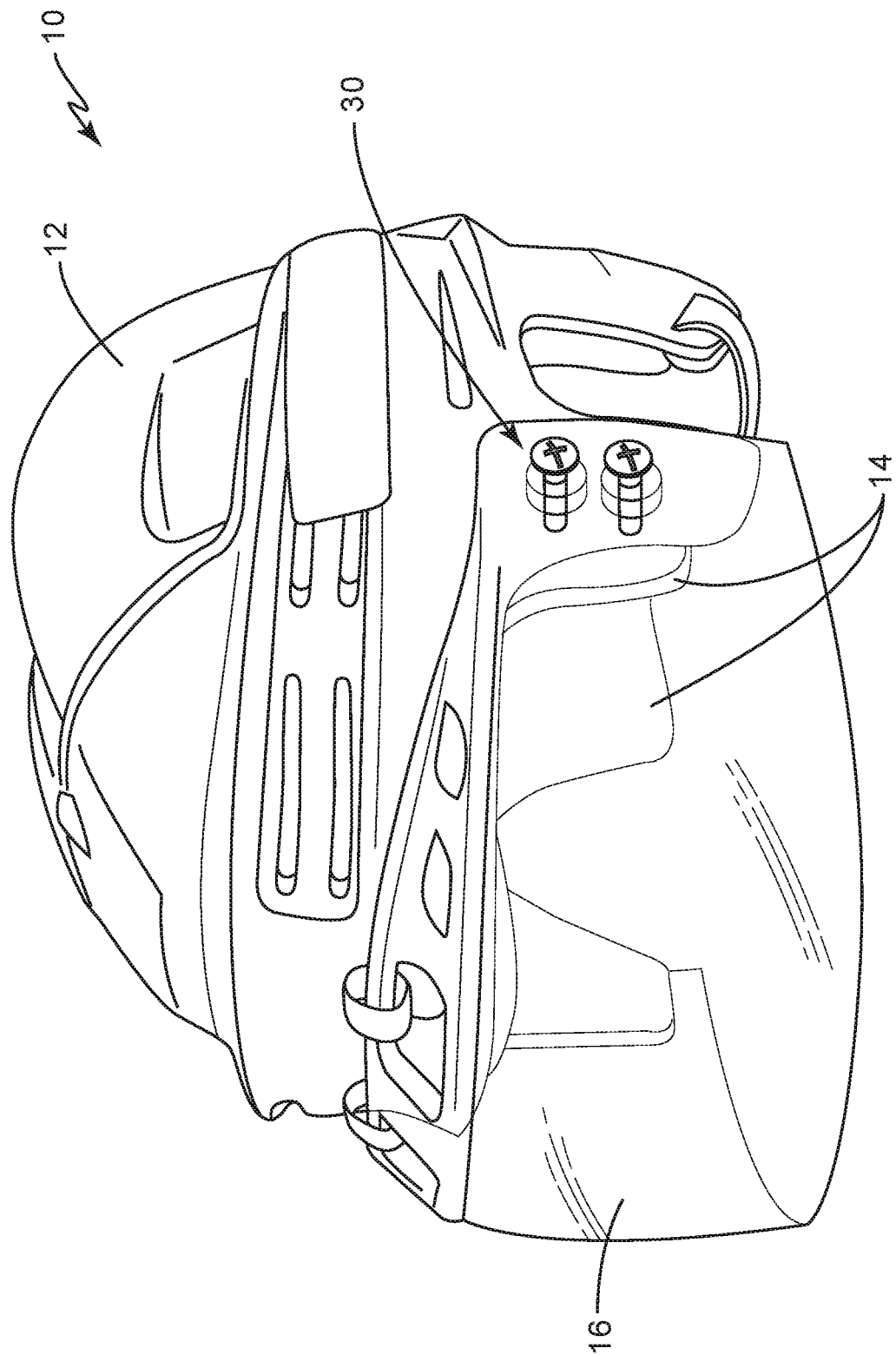
FIG. 1 is a perspective view of a protective face shield attached to protective headgear according to an embodiment of the present disclosure.

Turning now to the drawings, FIG. 1 is a perspective view illustrating a protective headgear of the type typically used by players in the sport of ice hockey. Those skilled in the art will readily appreciate that the use of an ice hockey helmet 10 is illustrative only. The present disclosure may, in fact, be utilized for releasably securing protective face shields to other types of protective headgear.

As seen in FIG. 1, the protective headgear 10 comprises a helmet 12 and a face shield 16. The helmet 12 and the face shield 16 may comprise any known helmet and/or face shield known in the art, and are generally manufactured by companies such as BAUER, CCM, EASTON, NIKE, ITECH, JOFFA, and CASCADE. As described in more detail later, a mounting assembly 30 configured according to one embodiment of the present disclosure attaches one end of the face shield 16 to the a first side of helmet 12. Although not specifically seen in FIG. 1, another mounting assembly 30 is present on the opposite side of helmet 12 to attach the other end of the face shield 16 to the other side of helmet 12.

Helmet 12 is typically constructed from a high impact-resistant plastic, and includes a specially formulated protective foam 14 affixed to the interior. Generally, the foam 14 covers most or all of the interior of helmet 12, and is able to sufficiently absorb a kinetic impact to protect the wearer to reduce the chance of concussion-related injuries. Some suitable types of foam 16 include, but are not limited to, Expanded Polypropylene (EPP) foam and Fused Expanded Polypropylene (FXPP) foam.

The face shield 16 is arcuately shaped to generally conform to the shape of the front of helmet 12 and the player's face. The face shield 16 is transparent and attaches to the helmet 12 at each lateral side using a mounting assembly 30 configured according to the present disclosure. Like helmet 12, the face shield 16 is manufactured from a high impact-resistant plastic to specifically protect the player's eyes and at least a portion of the player's face from being injured by objects such as the puck, sticks, the ice surface, the boards, and the bodies of the other players.

There are different types of protective face shields 16 suitable for use with the present disclosure. As seen in FIG. 1, for example, the face shield 16 comprises a type of protective shield known as a "visor" or "half-shield." The term "visor" is typically used to describe a protective shield that covers and protects only the upper part of the player's face while leaving the lower part of the player's face open and uncovered. Another type of face shield suitable for use with the present disclosure, however, is a "full face shield." The term "full face shield" is typically used to describe a transparent protective shield that covers most or all of the player's entire face. Similarly, a "cage" is sometimes used as a protective face shield. A "cage" is a term used to describe a metallic mesh formed as a grid that attaches to the front and sides of the helmet to cover and protects a person's entire face.

Regardless of the specific type of protective face shield, however, the term "face shield" is used herein to generically refer to all three types of protective face shields—the "visor," the "full face shield," and the "cage." Thus, although the presently illustrated embodiments show only a visor, those skilled in the art should appreciate that this is for illustrative purposes only. The mounting assembly 30 of the present disclosure may be used to mount a visor, a full face shield, or a cage to helmet 12.

Figure 2:
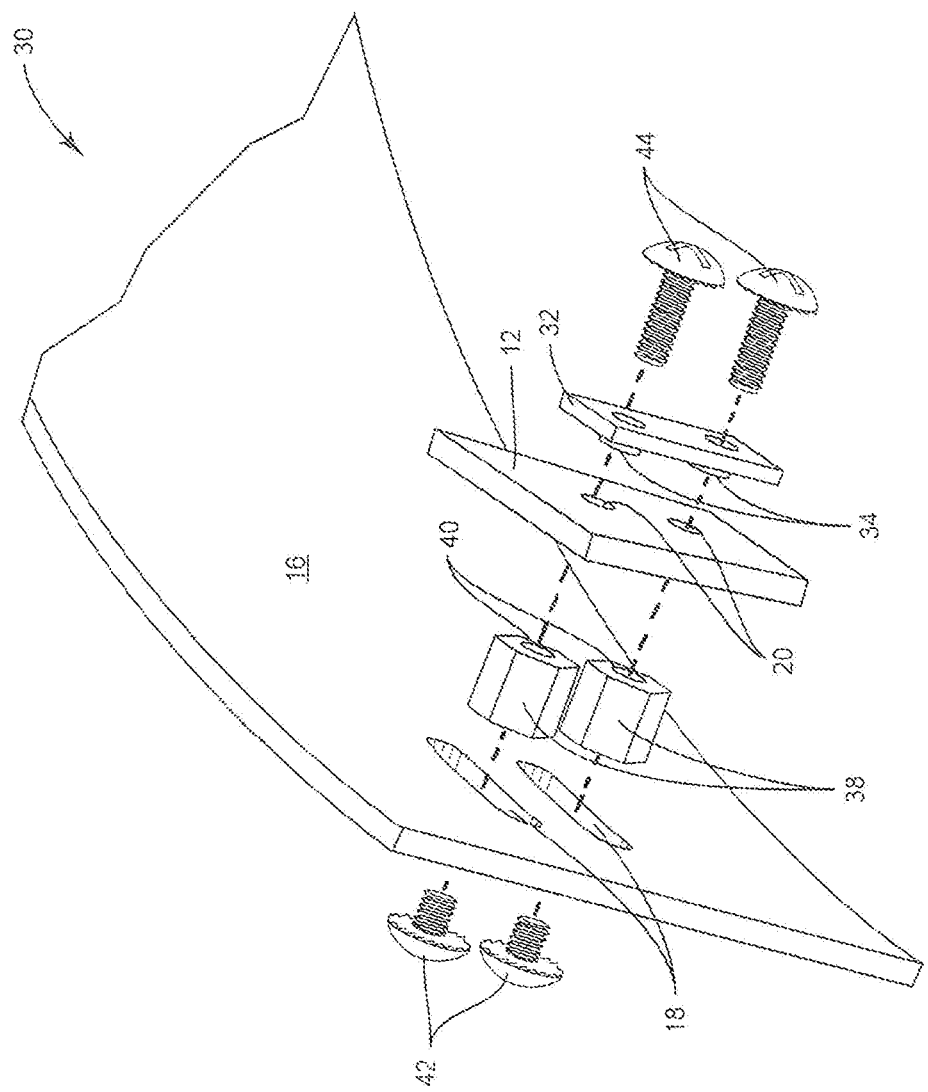
FIG. 2 is an exploded view of a mounting assembly for a face shield according to an embodiment of the present disclosure.

FIG. 2 is an exploded view illustrating a mounting assembly 30 configured according to one embodiment of the present disclosure and how it mounts the face shield 16 to helmet 12. As seen in FIG. 2, the mounting assembly 30 comprises a substantially rectangular base 32 and a pair of cylindrical posts 34 affixed to, and extending outwardly from the base 32. Each post 34 is approximately the same size and includes a first threaded interior receptacle 36 (seen later in FIG. 5A-5D). The base 32 and the posts 34 may be manufactured separately and fixedly attached to each other, or cast or molded as a unitary piece. Further, base 32 may be manufactured from any material known in the art. Suitable materials include, but are not limited to, any kind of metal or metal alloy and high impact-resistant plastics.

The mounting assembly 30 further comprises a spacer assembly comprising first and second spacers 38. As seen in FIG. 2, the first and second spacers 38 are two independent and distinct objects; however, this is not required. In some embodiments, the first and second spacer may be formed as a unitary body. Regardless of the particular embodiment, however, the spacers 38, when installed, are disposed between the exterior surface of the helmet 12 and a surface of the face shield 16. More particularly, a first terminal surface of each spacer 38 contacts the exterior surface of the helmet 12 while the opposing terminal surface of each spacer 38 contacts the surface of the face shield 16. In this position, the spacers 38 space at least a part of the face shield 16 away from the exterior surface of the helmet 12.

Figure 6B:
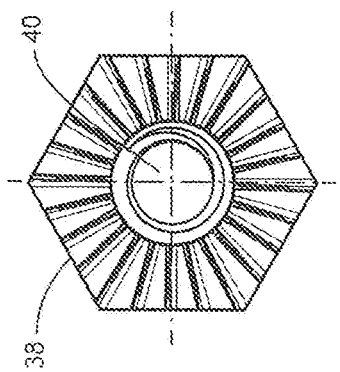
FIGS. 6A-6N illustrate various spacers of a mounting assembly according to various embodiments of the present disclosure.
Figure 6D:
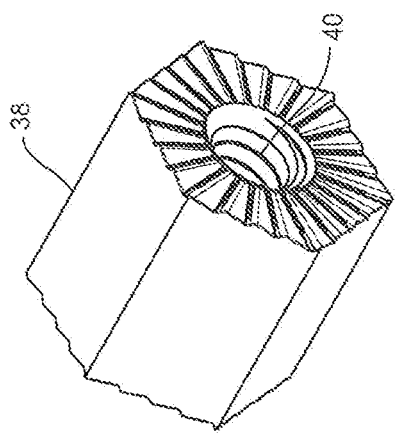
Figure 6A:
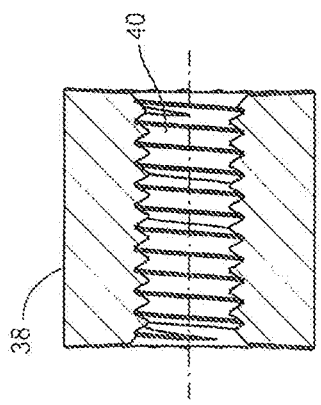
Figure 6C:
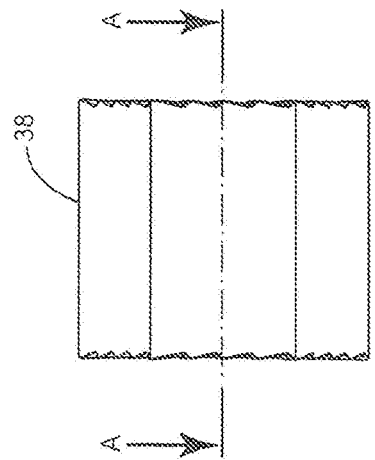
Figure 6E:
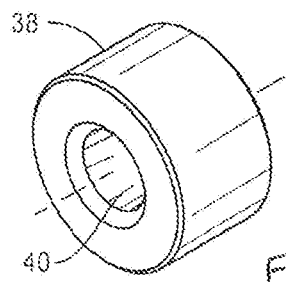
Figure 6F:
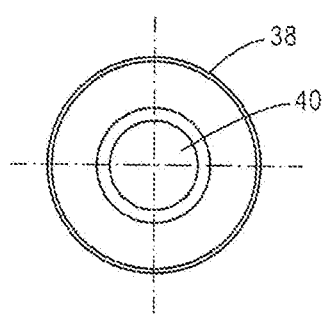
Figure 6G:
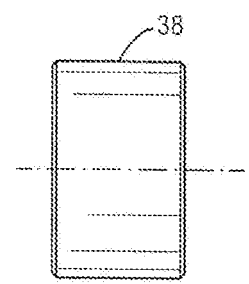
Figure 6H:
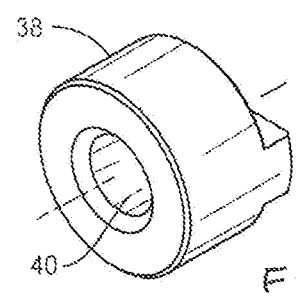
Figure 6I:
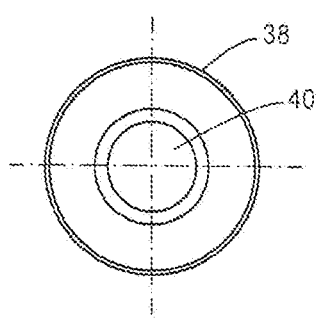
Figure 6J:
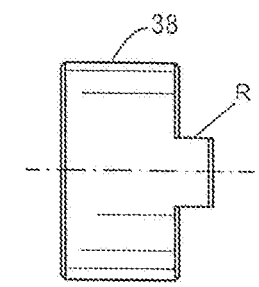
Figure 6L:
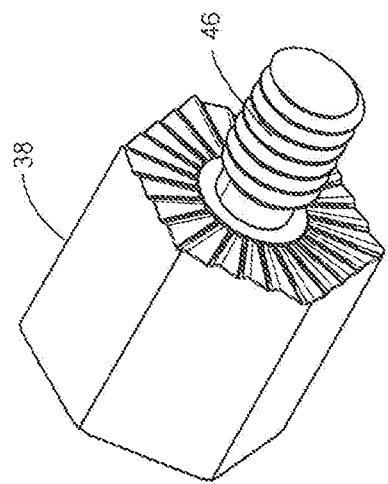

In this embodiment, each spacer 38 is disposed on the exterior of the helmet 12, and includes a through hole 40 extending through the spacer 38 (see FIGS. 6A-6C). In some cases, the holes 40 may be threaded and sized and shaped to receive mechanical fasteners 42, 44. Specifically, the posts 34 extend outwardly from the base 32 and into holes 20 in the sides of helmet 12. In this embodiment, posts 34 will not extend entirely through the holes 20. Rather, the posts 34 will only extend far enough into the holes 20 such that the terminal ends of posts 34 are substantially flush with, or slightly below, the exterior surface of the helmet 12.

The mounting assembly 30 also comprises a first pair of mechanical fasteners 42 to attach the face shield 16 to helmet 12, and a second pair of mechanical fasteners 44 to connect the base 32 to the helmet 12. Specifically, the fasteners 42 extend through corresponding slots 18 formed in the face shield 16 and threadingly engage the corresponding holes 40 of spacer 38. Mechanical fasteners 44 extend through corresponding posts 34 in base 32 and threadingly engage the corresponding holes 40 of spacer 38 at the opposite end. Thus, as seen later in more detail, the holes 40 in each of the spacers 38 are threaded. And, when attached to the posts 34, fasteners 42, 44 sufficiently secure the face shield 16 to helmet 12.

Generally, as seen in the figures, each set of mechanical fasteners 42, 44 comprise first and second screws; however, those of ordinary skill in the art will readily appreciate that this is not required. Mechanical fasteners 42 and/or 44 may comprise any mechanical fastener known in the art.

Figure 3:
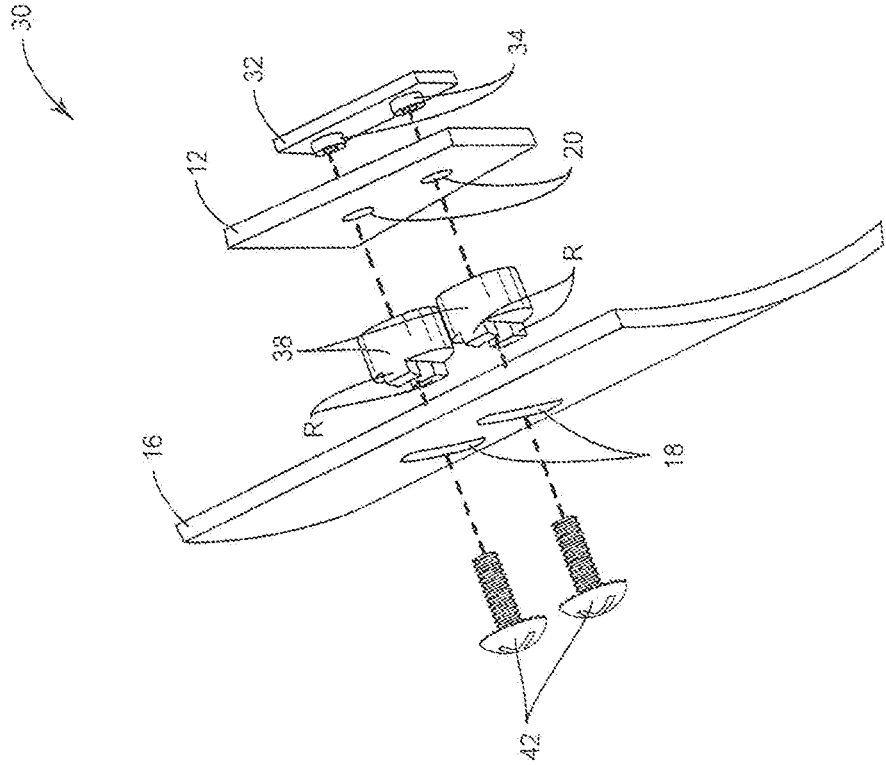
FIG. 3 is an exploded view of a mounting assembly for a face shield according to an embodiment of the present disclosure.

FIG. 3 is an exploded view illustrating a mounting assembly 30 configured according to another embodiment of the present disclosure and how the assembly 30 mounts the face shield 16 to helmet 12. In this embodiment of the present disclosure, the mounting assembly 30 also comprises substantially rectangular base 32 and a pair of cylindrical posts 34 affixed to, and extending outwardly from, the surface of base 32. The base 32 is disposed on the interior of the helmet 12 such that the posts 34 extend into corresponding holes 20. As above, posts 34 are sized such that, when inserted into holes 20, the terminal end of each post 34 is substantially flush with, or slightly lower than the exterior surface of helmet 20.

This embodiment of the present disclosure also comprises first and second independent spacers 38 disposed between the exterior surface of the helmet 12 and the surface of the face shield 16. The spacers 38 are generally cylindrical with the first terminal surface of each spacer 38 contacting the exterior surface of the helmet 12. The opposite terminal surface of each spacer 38, however, comprises a raised ridge R. The ridges R are formed on the surface of the spacers 38, and are sized to seat within the horizontally-oriented slots 18 of face shield 16. However, at least some part of the surface of spacers 38 contacts the surface of the face shield 16.

The slots 18 may be long enough to allow for the spacers 38 to move laterally (i.e., forward and rearward movement) relative to the face shield 16 to facilitate the user aligning the shield 16 during the installation of the shield 16. Once installed, at least some part of the surface of each spacer 38 contacts the surface of the face shield 16 to space the face shield 16 away from helmet 12. In addition, however, the ridges R inserted into the slots 18 prevent the inadvertent rotation or movement of the face shield 16 due to factors such as the high-impact forces and/or torque associated with a violent collision with another person or object.

As in the previous embodiment, mechanical fasteners 42 securely fasten the face shield 16 to the helmet 12. In this embodiment, however, the mechanical fasteners 42 extend through the slots 18 from the exterior of shield 16, as well as through the holes 40 of spacers 38, and into the threaded receptacle of each post 34. So attached, the face shield 16 is securely attached to the helmet 12.

FIG. 4 is an exploded view illustrating a mounting assembly 30 configured according to another embodiment of the present disclosure and how the assembly 30 mounts the face shield 16 to helmet 12. In this embodiment, mounting assembly 30 comprises base 32 and posts 34, as previously described. Mounting assembly 30 also comprises a pair of spacers 38 disposed between the interior surface of face shield 38 and the exterior surface of helmet 12. As above, a surface of each spacer 38 at one terminal end contacts the interior part of the shield, while at least a part of the surface at the opposing terminal end of spacer 38 contacts the exterior surface of the helmet 12.

Additionally, as seen in FIG. 4, each spacer 38 has a threaded post 46 that extends from a central portion of its terminal surface. When the mounting assembly 30 is installed, the threaded posts 46 extend into the holes 20 formed in helmet 12 and threadingly engage the interior receptacles 36 of corresponding posts 32. In this embodiment, the spacers 38 also comprise a central threaded receptacle 48 (see FIG. 6K-6N) formed to receive the mechanical fasteners 42 extending through the slots 18 in face shield 16. So installed, the face shield 16 is securely mounted to the helmet 12.

FIGS. 5A-5D illustrate a base 32 of mounting assembly 30 according to one embodiment of the present disclosure. As previously stated, each post 34 extends from a surface of the base 32, and comprises a threaded interior receptacle 36 configured to receive a mechanical fastener (e.g., mechanical fastener 42 and/or 44) and/or the threaded post 46 of a spacer 38. FIGS. 5A-5D provide specific dimensions and tolerances for base 32. However, those of ordinary skill in the art will appreciate that these are illustrative only.

Figure 6N:
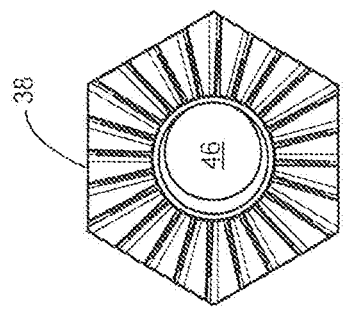
Figure 6K:
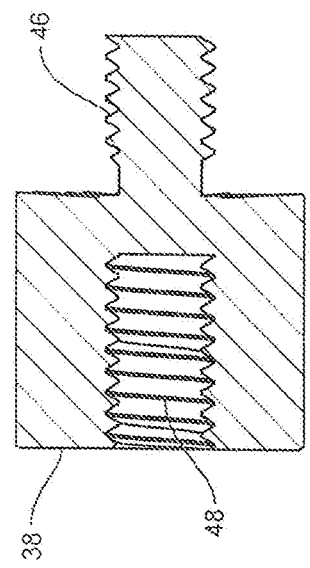
Figure 6M:
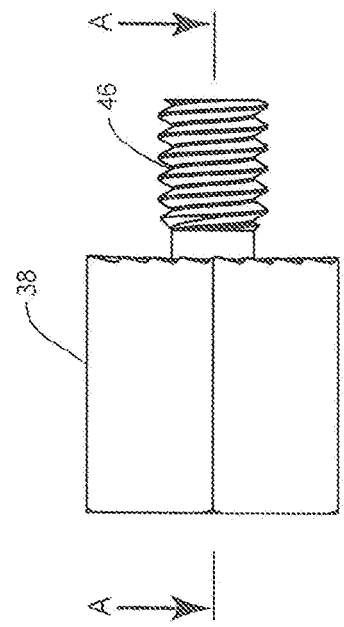
Figure 7A:
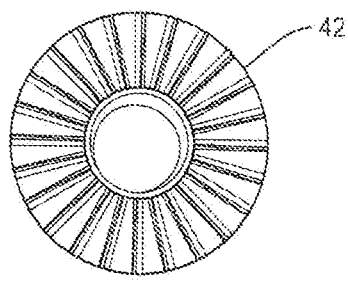
FIGS. 7A-7H illustrate various mechanical fasteners suitable for use with a mounting assembly of the present disclosure.
Figure 7B:
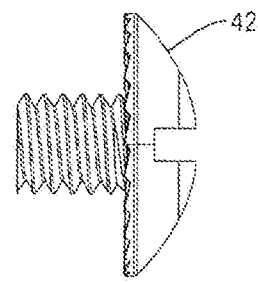
Figure 7C:
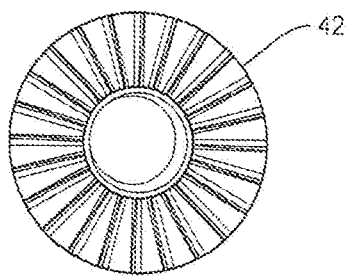
Figure 7D:
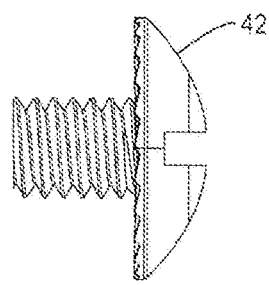
Figure 7E:
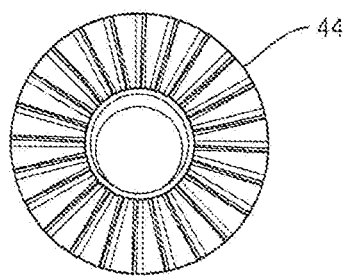
Figure 7F:
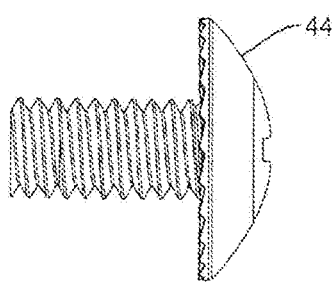
Figure 7G:
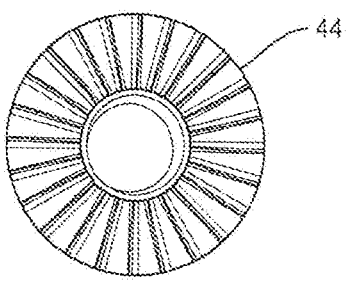
Figure 7H:
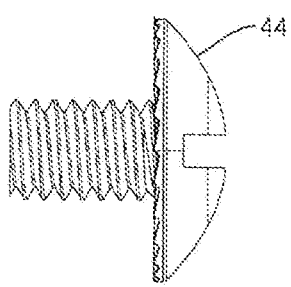

FIGS. 6A-6N illustrate different spacers 38 suitable for use in a mounting assembly 30 according to various embodiments of the present disclosure. Regardless of the particular type of spacer 38, each comprises a hole 40 that is configured to receive corresponding mechanical fasteners 42 and/or 44. In some embodiments, the end surfaces of the spacers 38 may be chamfered so as to help prevent rotation of the spacer 38 after the mounting assembly has been installed. FIGS. 6A-6N also provide specific dimensions and tolerances for each different type of spacer 38. However, those of ordinary skill in the art will appreciate that these are illustrative only.

FIGS. 7A-7H illustrate various mechanical fasteners 42, 44 that are suitable for use with a mounting assembly 30 of the present disclosure. As seen in these Figures, the mechanical fasteners may be chamfered so as to help prevent the fasteners 42, 44 from coming loose after installation. It should be noted that FIGS. 7A-7D identify the mechanical fastener as being mechanical fastener 42, and that FIGS. 7E-7H identify the mechanical fastener as being mechanical fastener 44. However, this, too, is for illustrative purposes only. Any of the mechanical fasteners seen in FIGS. 7A-7H may be a mechanical fastener 42 or a mechanical fastener 44.

FIGS. 8A-8D and 9A-9C illustrate a base 50 (FIGS. 8A-8D) and spacer 60 (FIG. 9A-9C) configured according to another embodiment of the present disclosure. In this embodiment, base 50 comprises a segmented base having two segments 52a, 52b. The segments 52a, 52b are manufactured separately, and then coupled together by inserting a tab T formed on one of the segments 52a, 52b, into a correspondingly shaped slot L formed on the other of the segments 52a, 52b. Once coupled together, the base 50 may be spot welded 58 one or more times along the connecting line between the two segments 52a, 52b to help ensure that the segments 52a, 52b will not inadvertently separate.

Base 50 also comprises a pair of posts 54 extending from a surface of base 50, with each post 54 comprising an interior receptacle 56 configured to receive a mechanical fastener (e.g., mechanical fastener 42 and/or 44). Base 50 differs from base 32 of the previous embodiments in that the posts 54 of base 50 extend into and all the way through the holes 20 formed in helmet 12. The posts also extend into the holes 40 of the spacer. More specifically, one or both of the posts 54 may extend into a spacer such that the terminal end of the spacer is slightly below, or substantially even with, a surface of the spacer.

Figure 9A:
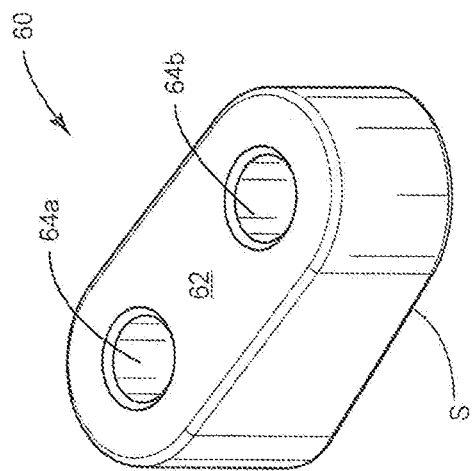
FIGS. 9A-9C illustrate a spacer having a unitary body according to an embodiment of the present disclosure.
Figure 9B:
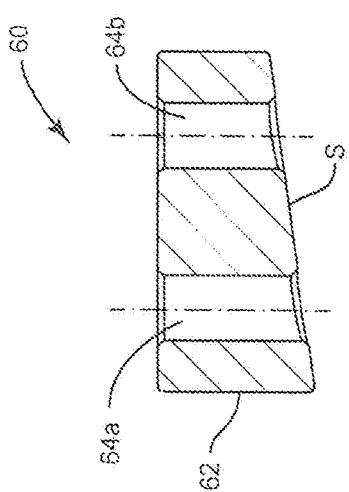
Figure 9C:
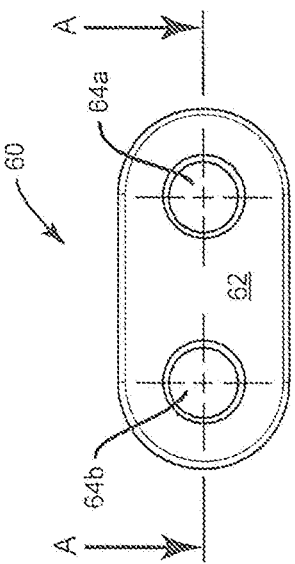

FIGS. 9A-9C illustrate another embodiment of the spacer 60 that may be utilized with the base 50 of FIGS. 8A-8D. In previous embodiments, the spacer assembly comprised a pair of independent spacers 38, each having their own hole 40 to receive corresponding posts 34. In this embodiment, however, the spacer 60 comprises an elongated, single, unitary spacer body 62 having a pair of spaced-apart holes 64a, 64b formed therein. As stated previously, the through holes 64a, 64b in spacers 60 are sized and shaped to yieldingly resist the user's efforts at placing the spacer over the posts 54. It also yieldingly resists the user's efforts at removing the spacer 60 from posts 54 thereby preventing the spacer 60 from becoming freely detached from the posts 54. Thus, once installed, the spacers 60 function to retain or "lock" the base 50 and the posts 54 to the helmet 12, thereby preventing the mounting assembly 30 from inadvertently becoming detached from the helmet 12.

Additionally, in this embodiment of spacer 60, body 62 comprises a slanted surface S. The body 62 slides over posts 54 such that the slanted surface S contacts the exterior of the helmet 12. In cases where the exterior surfaces of helmet 12 is slanted or angled, the slanted surface S of body 12 may help to maintain the body 62 securely against the helmet 12.

It should be noted that, while not specifically shown in FIG. 9A-9C, the spacer 60 may also include the ridges R sized to fit into slots 18.

Embodiments of the present disclosure provide a mounting assembly for attaching a face shield to a protective helmet. The assembly comprises a base having a planar surface, first and second posts extending from the planar surface of the base, and a spacer. The base is configured to be disposed on an interior of the helmet. The first and second posts are connected to, and extend outwardly from, the base. The first and second posts insert into corresponding holes formed in the helmet such that a terminal end of at least one of the first and second posts is substantially flush with, or below, an exterior surface of the helmet. The spacer spaces the face shield away from the exterior surface of the helmet, and receives one or more mechanical fasteners that releasably attach the face shield to the helmet.

The present disclosure may, of course, be carried out in other ways than those specifically set forth herein without departing from essential characteristics of the disclosure. For example, the posts 34 seen in the embodiments are all cylindrically-shaped. However, the present disclosure is not so limited. Those skilled in the art will appreciate that the posts 34 may be any shape and size desired. Therefore, the present embodiments are to be considered in all respects as illustrative and not restrictive, and all changes coming within the meaning and equivalency range of the appended claims are intended to be embraced therein.

What is claimed is:

1. A mounting assembly for attaching a face shield to a protective helmet, the assembly comprising:
   a base having a planar surface;
   a first post connected to, and extending from, the base, and configured to be inserted into a first hole formed in the protective helmet such that a terminal end of the first post is flush with, or below, an exterior surface of the protective helmet; and
   a spacer assembly comprising a first through hole configured to:
      threadingly receive, at a first end of the spacer assembly, a first mechanical fastener that attaches the base to the spacer assembly, wherein the first mechanical fastener extends, from an interior of the helmet to the first end of the spacer assembly, through the base, an interior of the first post, the helmet, and into the first through hole at the first end of the spacer assembly; and
      threadingly receive, at a second end of the spacer assembly opposite the first end, a second mechanical fastener that attaches the face shield to the spacer assembly, wherein the second mechanical fastener extends from an exterior of the face shield through the face shield and into the second end of the spacer assembly.

2. The mounting assembly of claim 1 wherein the spacer assembly comprises a unitary spacer.

3. The mounting assembly of claim 1 wherein the spacer assembly comprises first and second spacers, each spacer comprising a corresponding one of the first and second through holes.

4. The mounting assembly of claim 1 further comprising a second post connected to, and extending from, the base, and configured to be inserted into a second hole formed in the protective helmet such that a terminal end of the second post is flush with, or below, the exterior surface of the protective helmet.

5. The mounting assembly of claim 4 wherein the spacer assembly further comprises a second through hole configured to:

threadingly receive, at the first end, a third mechanical fastener that attaches the base to the spacer assembly; and threadingly receive, at the second end, a fourth mechanical fastener that attaches the face shield to the spacer assembly.

6. The mounting assembly of claim 4 wherein the base comprises a segmented base having a first segment fixedly attached to a second segment, and wherein the first post is connected to, and extends from, the first segment of the base, and the second post is connected to, and extends from, the second segment of the base.

7. The mounting assembly of claim 6 wherein the first segment of the base comprises a tab that is configured to fit into a corresponding slot formed in the second segment of the base.

* * * * *